United States Patent [19]

Fujisawa

[11] 4,354,246
[45] Oct. 12, 1982

[54] KEY INPUT INDICATING TONE GENERATING APPARATUS FOR SMALL-SIZED ELECTRONIC DEVICES

[75] Inventor: Hidetaka Fujisawa, Fussa, Japan
[73] Assignee: Casio Computer Co., Ltd., Tokyo, Japan
[21] Appl. No.: 102,737
[22] Filed: Dec. 12, 1979
[30] Foreign Application Priority Data
Dec. 21, 1978 [JP] Japan .................................. 53-157961
[51] Int. Cl.³ .............................................. G06F 3/16
[52] U.S. Cl. .................................. 364/709; 364/710; 179/1 SM
[58] Field of Search ............. 364/709, 710; 179/1 SM
[56] References Cited
U.S. PATENT DOCUMENTS 4,000,565  1/1977  Overby et al. .................. 364/710 X
4,179,584  12/1979  Tanimoto et al. ................ 179/1 SM
4,185,169  1/1980  Tanimoto et al. ................ 179/1 SM
4,211,892  7/1980  Tanimoto et al. ................ 179/1 SM

OTHER PUBLICATIONS

"Calculators Supply Answers Audibly Or In Braille" *Electronics* Nov. 27, 1975 pp. 39–40.
"Single Silicon Chip Synthesizes Speech in 50 Learning Aid" *Electronics* Jun. 22, 1978 p. 39.

*Primary Examiner*—David H. Malzahn
*Attorney, Agent, or Firm*—Frishauf, Holtz, Goodman & Woodward

[57] ABSTRACT

In a key input indicating tone generating system for small-sized electronic devices, key switches are classified into a plurality of groups according to their function. When key switches belonging to a group of key switches are operated, music tones are generated. When the key switches of at least one of the remaining groups of key switches are operated, tones different from the above mentioned tones are produced.

9 Claims, 9 Drawing Figures

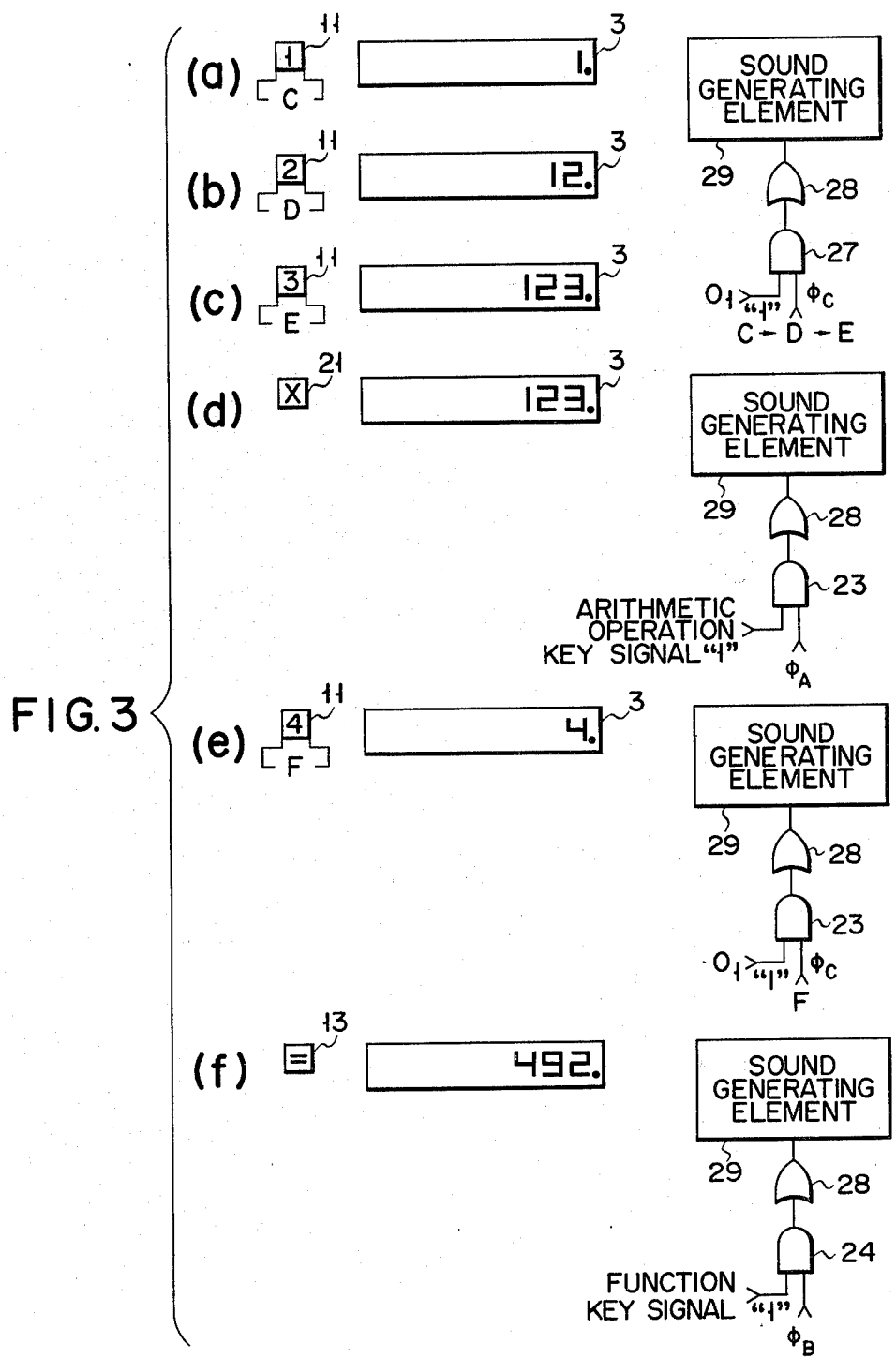

KEY INPUT INDICATING TONE GENERATING APPARATUS FOR SMALL-SIZED ELECTRONIC DEVICES

The invention relates to a key input system for small-sized electronic devices, such as electrofnic calculators, to generate an aurally sensible sound.

Recently, there has been proposed a new electronic calculator in which music tones previously related to the corresponding keys are sequentially generated for every key depression, thus enabling one to aurally understand the contents or instruction of a key depressed. In this proposal, many music tones are used with assignment of them to all the keys. In the operation of the function keys as well as the ten keys, many different music tones corresponding to the scales related to the depressed keys are generated. However, it is known that an ordinary person can discriminate but approximately ten scales at most. For this reason, even if the calculator can generate many different musical sounds, the operator can not discriminately understand such many sounds. In this point, this calculator is imperfect in its function.

Another proposed calculator sounds respectively related to the ten keys when the ten keys are depressed, but it makes no sound when the function keys are depressed. In this proposal, the operator can not aurally recognize whether the function keys have been operated.

Accordingly, an object of the invention is to provide a key input system for small-sized electronic devices, such as an electronic calculator, which enables an operator to discriminately recognize individual keys depressed or individual groups of input keys depessed by his auditory sense.

SUMMARY OF THE INVENTION

Broadly, the above object of the invention is achieved on the basis of a unique concept: Key switches are classified into a plurality of groups. When a group of key switches are operated, music tones are generated. When the key switches of at least one of the remaining groups are operated, tones different from the above-mentioned ones are produced.

According to another aspect of the invention, there is provided a key input indicating tone generating apparatus for small-sized electronic devices, such as an electronic calculator, comprising: a key input section with having a plurality of groups of keys; judging means for judging a key depressed and determining the group to which the depressed key belongs; and sounding means which, when keys in one of the groups of keys are depressed, gives music tones corresponding to the depressed keys, and which, when keys in at least one of the remaining groups of keys are depressed, gives sounds different from the music tones but aurally sensible.

With such a construction, an operator can discriminately recognize individual key switches depressed or individual groups of input keys depressed, aurally. Accordingly, the operator can instantly find an erroneous operation of the keys, so that a reliable and quick key operation is ensured.

BRIEF DESCRIPTION OF THE DRAWINGS

FIG. 3(a) to FIG. 3(f) are diagrams useful in explaining the operation of the electronic calculator with the key input indicating system of the invention.

DETAILED DESCRIPTION

Figure 1:
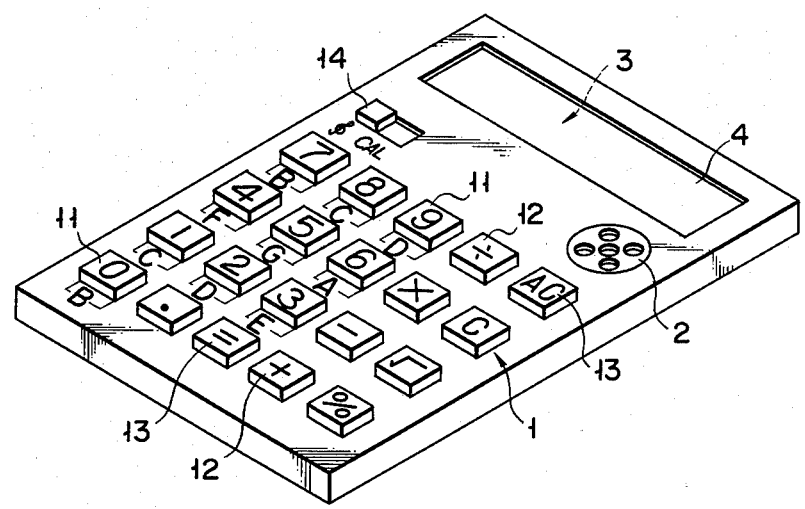
FIG. 1 is a perspective view of an electronic calculator to which a key input indicating system according to the invention is applied.

An embodiment of the invention comprising a key input indicating tone generating apparatus according to the invention applied to an electronic calculator will be described in detail referring to the drawings.

In FIG. 1, an electronic calculator into which a key input system of the invention is incorporated comprises a key input section 1 which includes ten keys 11 with the name of scales, such as "C, D, E, ..., C, D" marked, by printing, for example, at the positions related thereto on the calculator case, arithmetic operation keys 12 for performing arithmetic operations, function keys 13 such as a clear key, an equal key and the like in addition to the arithmetic operation keys, and a mode selection switch 14 for selecting a sound mode or a cal mode. The sound mode is marked as a G clef "𝄞" on the calculator case by printing, for example, and the cal mode as "CAL".

The calculator case is further provided with a sounding port 2 as a passage of sound generated in the calculator case and a display window 4 allowing the data displayed by a display unit provided in the calculator case to be seen from outside.

Figure 2:
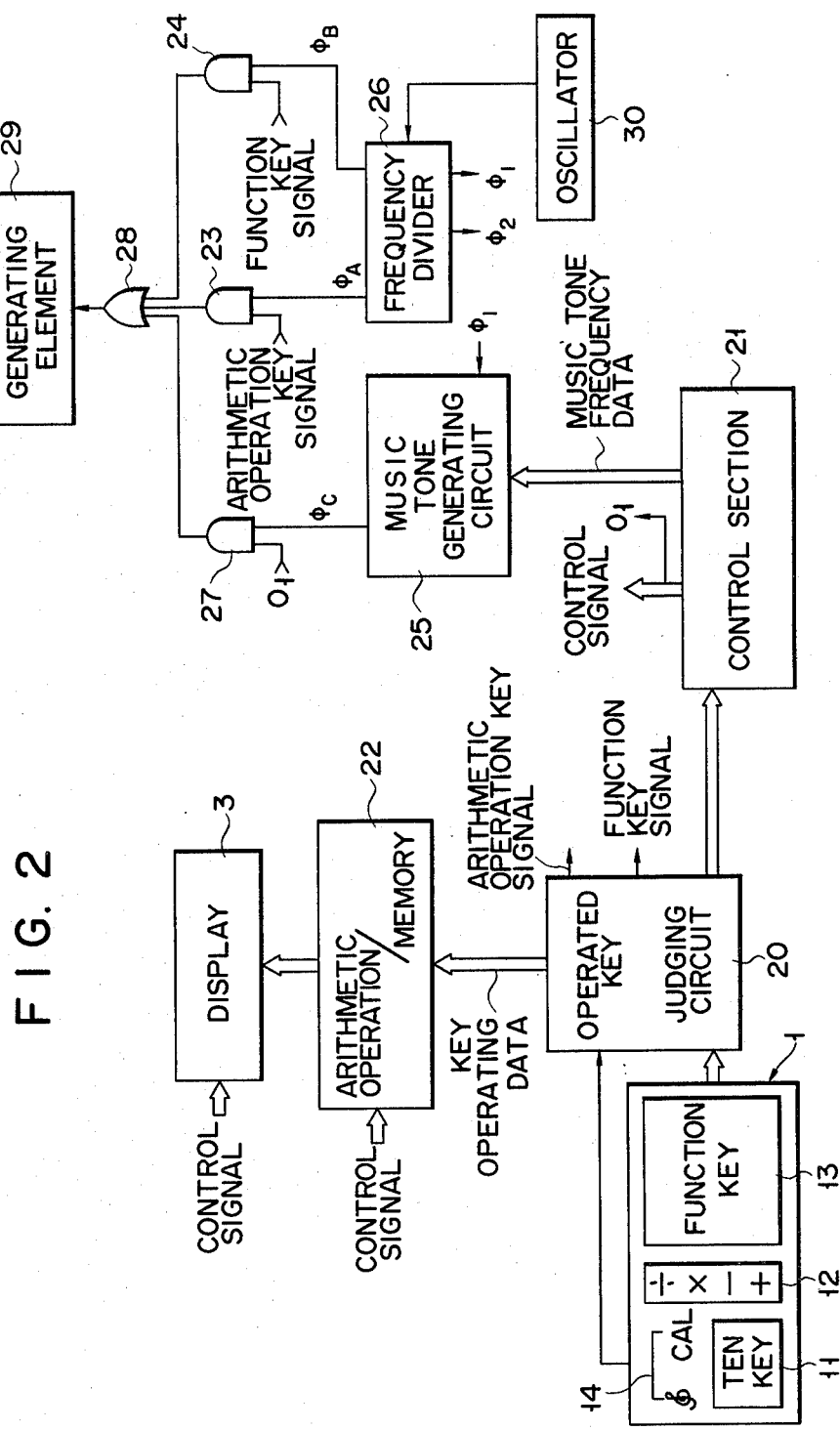
FIG. 2 is a block circuit diagram of the electronic calculator shown in FIG. 1.

In FIG. 2 showing a circuit construction of the embodiment, a key operation signal and a mode selecting signal derived from the key input section 1 are inputted to an operated key judging circuit 20 where a key operated or a mode specified is judged. The result of the judgement is applied to the control section 21. The key operating data from the ten keys 11 and the like is applied to an arithmetic operation/memory 22 where the data is subjected to various arithmetic operations. The operated data is finally transferred to a display 3 to be displayed thereby. The operated key judging circuit 20 further supplies an arithmetic operation key signal and a function key signal as gate signals to one input terminals of AND circuits 23 and 24 which are described later.

According to the judgement result derived from the operated key judging circuit 20, a control section 21 applies a variety of control signals to the arithmetic operation/memory 22, the display 3 and so on. In addition, when a ten key 11 is operated, it applies a music tone frequency data corresponding to the operated key to a music tone generating circuit 25.

The music tone generating circuit 25 properly frequency-divides a fundamental clock $\phi_1$ applied from a frequency divider 26 in accordance with the music tone frequency data and supplies the frequency-divided clock to one terminal of an AND circuit 27 (for ease of explanation, the signal applied to the AND circuit 27 is referred to as a clock $\phi_C$). On the other hand, a control signal $O_1$ from the control section is applied as a gate signal to the other input terminal of the AND circuit 27 of which the output signal is applied to a sound generating element 29 through the OR circuit 28.

Output signals from the AND circuit 23 and 24 are also applied to input terminals of the OR circuit 28.

When those circuits 23 and 24 are enabled, clocks $\phi_A$, $\phi_B$ from the frequency divider 26 are both applied to the sound generating element 29. Assume now that the frequencies $f\phi_A$, $f\phi_B$ and $f\phi_C$ of the respective clock signals $\phi_A$, $\phi_B$ and $\phi_C$ are related as follows:

$$f\phi_A << f\phi_C << f\phi_B \qquad (1)$$

It is further assumed that the frequency of the clock signal $\phi_C$ variously changes depending on the music tone selected, and those frequencies all satisfy equation (1). The frequency divider 26 frequency-divides the output signal from an oscillator 30 on the basis of given frequency division ratio to produce the clocks $\phi_A$ and $\phi_B$ and further fundamental clocks $\phi_1$ and $\phi_2$ which have the same frequencies and are different by $\pi$ in phase from each other. The respective circuits in FIG. 2 are operated in synchronism with the fundamental clocks $\phi_1$ and $\phi_2$.

The operation of an electronic calculator as described above will be described. The mode switch 14 is first set to the sound mode and then the key 1 is depressed, as shown in FIG. 3(a). Then, the depressed key is judged by the operated key judging circuit 20 to produce "1" as the key operating data which in turn is stored in the memory register in the arithmetic operation/memory section 22. The data is transferred to the display 3 where it is displayed as "1". The operated key judging circuit 20 further produces a signal representing the result of the judgement for transfer to the control section 21. In response to the judgement result signal, the control section 21 supplies the music tone frequency data of the scale "C" corresponding to the depressed switch 1 to the music tone generating circuit 25.

The music tone generating circuit 25 forms the clock $\phi_C$ with the frequency of the tone "C" by frequency dividing the basic clock $\phi_1$, in accordance with the music tone frequency data applied from the control section 21. The clock signal $\phi_C$ thus formed is applied to the AND gate 27. At this time, the control section 21 applies the control signal O₁ as a gate signal to the AND gate 27. As a result, the AND gate 27 is enabled to permit the clock signal $\phi_C$ to pass therethrough to the sound generating element 29 through the OR gate 28. As a result, the sound generating element 29 sounds the tone "C" corresponding to the depressed key switch 1. Hearing this sound generated, an operator recognizes that the key is depessed and the data is properly entered into the device.

Subsequently, the operator depresses the key switches 2 and 3, as shown in FIG. 3(b) and (c), so that the key input processes are performed as in the above-mentioned manner. Through the operations, the input data are displayed by the display 3 while at the same time the control section 21 supplied the music tone frequency data corresponding to the tones "D" and "E" to the music tone generating circuit 25, successively. Upon receipt of those data signals, the music tone generating circuit 25 successively forms the clock signals $\phi_C$ with the frequencies corresponding to the music tones "D" and "E" and supplies those signals to the sound generating element 29. As a result, the sound generating element 29 generates the music tones "D" and "E" corresponding to the operated keys 2 and 3, in order.

Then, a multiplication key of the arithmetic operation key 12 is operated as shown in FIG. 3(d). Upon the depression of the multiplication key, the operated key judging circuit 20 transfers function data to designate the multiplication to the memory register within the operation/memory section 22 where it is stored. At the same time, the key input data (second operand), "123.", is transferred to another memory register within the operation/memory 22 in accordance with a control signal derived from the control section 21 and is stored protectively therein. The operated key judging circuit 20 further supplies the arithmetic operation key signal which in turn enables the AND circuit 23 to permit the clock signal $\phi_A$ to be fed to the sound generating element 29.

As a result, the sound generating element 29 generates a sound (low-pitched sound) with the frequency of the clock $\phi_A$ and an operator aurally confirms that the operation of the arithmetic operation key 12 is operated surely.

Then, numeral data (second operand) "4" is inputted into the register by depressing the key switch [4], as shown in FIG. 3(e). Similarly, the numeral data is loaded into the memory register in the operation/memory section 22 and then is transferred to the display 4 where it is displayed as "4". At the same time, the music tone frequency data corresponding to the music tone "F" is applied from the control section 21 to the music tone generating circuit 25 where the clock $\phi_C$ with the frequency of the music tone "F" is formed. The clock $\phi_C$ formed is applied from the circuit 25 to the sound generating element 29 thereby to make a sound.

After the second operand (in this example, a multiplier) is inputted, the equal key as one of the function keys 13 is operated, so that the operation "123×4=" is performed in the operation/memory section 22. The result of the operation "492." is transferred to the display 3 where it is displayed, while at the same time, the operated key judging circuit 20 applies a function key operating signal to the AND circuit 24 thereby to enable the AND circuit 24 to permit the clock signal $\phi_B$ to reach the sound generating element 29.

In this way, the sound generating element 29 makes a sound (high-pitched sound) corresponding to the frequency of the clock $\phi_B$. Hearing the sound, the operator aurally confirms that the function key 13 is operated surely.

In the above-mentioned embodiment, the operation "123×4=" was explained as an example. The same similar operation is applicable for other operations. For example, when the operated key switch is the ten key 11, the music tone previously related to the ten key 11 is generated by the sound generating element 29. In the case of the arithmetic operation key 12, a low-pitched tone is sounded. In the case of the function key 13, a high-pitched tone is produced. Accordingly, hearing such sounds, the operator may recognize individually the operated key switch or the group including the operated key by his auditory sense.

The above-mentioned embodiment was so designed to generate the musical tone, and the low- and high-pitched tones related to the ten key 11, the arithmetic operation key 12 and the function key 13 when those are operated. Those tones may be changed properly with respect to those keys. Further, the key switches may be functionally grouped in another way; the ten key 11 and the remaining key switches, and the arithmetic operation key 12, the memory operation key (key switches such as M+, M−, MR and the like), and the remaining function keys. As another modification, even when the mode switch is set to the sound mode, no sound is produced for the depression of the key switch belonging to some key switch groups.

Various changes, modifications and applications may also be allowed in the method and circuit to form the clocks with the fixed frequency and the music tone frequency to be applied to the sound generating element 29.

In addition to an electronic calculator, the key input system of the invention is applicable for other suitable electronic devices such as an electronic timepiece.

As described above, in the key input system according to the invention, key switches are classified into a plurality of groups. In operating key switches belonging to a group of key switches, music tones related to the depessed keys are generated correspondingly. In operating key switches of at least one group of the remaining ones, sounds different from the above-mentioned ones but aurally sensible are generated. Accordingly, the operated key switch or the group including the operated one may individually be recognized aurally. Accordingly, an erroneous operation of the key switch can be found instantly, thereby allowing a quick key operation.

What is claimed is:

1. A key input indicating tone generating apparatus for small-sized electronic devices, comprising:
a key input section having a plurality of groups of keys;
judging means coupled to the key input section for judging a key depressed and determining the group of keys to which the depressed key belongs;
frequency control means coupled to said judging means;
an oscillator for generating signals having a given frequency;
frequency forming means coupled to the oscillator and to the frequency control means for selectively generating signals of predetermined frequency and signals of different frequencies, using at least the given frequency signals from the oscillator; and
sound generating means coupled to the frequency forming means and responsive to a single frequency signal from the frequency forming means, for generating tones of different pitches as a function of the frequency of the signal received from the frequency forming means;
said frequency control means controlling the frequency forming means to cause the frequency forming means to generate said signals of different frequencies when it is judged by the judging means that at least one key of a first group are depressed and to cause said frequency forming means to generate said signals of predetermined frequency when it is judged by the judging means that at least one key of a second group is depressed;
whereby said sound generating means generates a plurality of tones of respective different pitches when keys of the first group are depressed and tones of the same pitch when keys of the second group are depressed.

2. A key input indicating tone generating apparatus according to claim 1, wherein said frequency control means controls said frequency forming means so that signals of different frequencies corresponding to musical tones "C", "D", "E", and so on are generated responsive to the judging means judging that at least one key of the first group is depressed, whereby said tone generating means generates musical tones when keys of the first group are depressed.

3. A key input indicating tone generating apparatus according to claim 2, wherein said frequency forming means comprises:
a frequency divider for dividing signals that are delivered from said oscillator to generate said signals of predetermined frequency; and
a music tone generating circuit for generating said signals of different frequencies responsive to said frequency control means in accordance with depressed keys of said first group.

4. A key input indicating tone generating apparatus according to claim 1 or 2, wherein the keys of the first group are ten keys.

5. A key input indicating tone generating apparatus according to claim 4, wherein the keys of the second group are function keys.

6. A key input indicating tone generating apparatus according to claim 1 or 2, wherein the keys of the second group are function keys.

7. A key input indicating tone generating apparatus for small-sized devices, comprising:
a key input section having three groups of keys;
judging means coupled to the key input section for judging a key depressed and determining the group of keys to which the depressed key belongs;
frequency control means coupled to said judging means;
an oscillator for generating signals having a given frequency;
frequency forming means coupled to the frequency control means and to the oscillator for selectively generating signals of predetermined frequency and signals of different frequencies of musical tones "C", "D", "E", etc., using at least the given frequency signals from the oscillator;
sound generating means coupled to the frequency forming means and responsive to a single frequency signal from the frequency forming means, for generating tones of different pitches as a function of the frequency of the signal received from the frequency forming means;
said frequency controlling means controlling said frequency forming means such that said signals of different frequencies of musical tones "C", "D", "E" etc., each of which corresponds to a key of a first group, are generated when it is judged by said judging means that the keys of the first group are depressed, a first signal of a single predetermined frequency is generated when it is judged by said judging means that the keys of a second group are depressed, and a second signal of a single predetermined frequency different from said first single specific frequency is generated when the keys of a third group are depressed; and
said sound generating means generating tones of different pitches when the keys of said first group are depressed, tones of a first pitch when the keys of said second group are depressed, and tones of a second pitch different from said first pitch when the keys of said third groups are depressed.

8. A key input indicating tone generating apparatus according to claim 7, wherein the keys of the first group are ten keys; the keys of the second group are "+", "−", "×" and "÷" keys; and the keys of the third group are function keys.

9. A key input indicating tone generating apparatus according to claim 7, wherein said frequency forming means comprises:
a frequency divider for dividing signals that are delivered from said oscillator to generate said signals of predetermined frequency; and
a music tone generating circuit for generating said signals of different frequencies responsive to said frequency control means in accordance with depressed keys of said first group.

* * * * *